United States Patent [19]
Taguchi et al.

[11] Patent Number: 5,206,716
[45] Date of Patent: Apr. 27, 1993

[54] CAMERA HAVING DIGITAL-TO-ANALOG CONVERTER WITH VARIABLY SETTABLE REFERENCE LEVEL

[75] Inventors: Tomishige Taguchi, Saitama; Makoto Kondo, Kanagawa, both of Japan

[73] Assignee: Canon Kabushiki Kaisha, Tokyo, Japan

[21] Appl. No.: 727,293

[22] Filed: Jul. 9, 1991

Related U.S. Application Data

[63] Continuation of Ser. No. 512,873, Apr. 23, 1990.

[30] Foreign Application Priority Data

Apr. 28, 1989 [JP] Japan .................................. 1-109522

[51] Int. Cl.$^5$ .............................................. H04N 9/07
[52] U.S. Cl. ........................................ 358/41; 358/80
[58] Field of Search .................. 358/29, 29 C, 41, 44, 358/98, 81, 75, 80, 209, 228, 445, 446, 461, 463

[56] References Cited

U.S. PATENT DOCUMENTS

| | | |
|---|---|---|
| 3,775,568 | 11/1973 | Hino et al. . |
| 4,651,227 | 3/1987 | Yunoki et al. . |
| 4,727,413 | 2/1988 | Miura et al. . |
| 4,809,061 | 2/1989 | Suzuki ................. 358/29 C |
| 4,811,086 | 3/1989 | Hieda ................. 358/29 C |
| 4,847,684 | 7/1989 | Eino . |
| 4,864,391 | 9/1989 | Taguchi ................. 358/80 |
| 4,882,619 | 11/1989 | Hasegawa et al. ........... 358/44 |
| 5,105,286 | 4/1992 | Sakurai ................. 358/461 |

FOREIGN PATENT DOCUMENTS

0289944 11/1988 European Pat. Off. .

Primary Examiner—Edward L. Coles, Sr.
Assistant Examiner—Kim Yen Vu
Attorney, Agent, or Firm—Robin, Blecker, Daley & Driscoll

[57] ABSTRACT

A camera comprises a selection circuit which selects either an image signal read out from an image sensor or a reproduced signal obtained from a recording medium; an A/D converter which converts into a digital signal the signal selected by the selection circuit; a storage circuit for storing the digital signal; and a reference control circuit which is arranged to control the reference voltage of the A/D converter by using a white balance control signal when the image signal is selected by the selection circuit and to make the reference voltage constant when the reproduced signal is selected.

17 Claims, 7 Drawing Sheets

$$Y_{00} = K_1 G(P_{01}) + K_2 R(P_{00}) + K_3 B(P_{10})$$
$$(R-Y)_{00} = R(P_{00}) - Y_{00}$$
$$(B-Y)_{00} = B(P_{10}) - Y_{00}$$

$$Y_{01} = K_1 G(P_{01}) + K_2 R(P_{11}) + K_3 B(P_{02})$$
$$(R-Y)_{01} = R(P_{11}) - Y_{01}$$
$$(B-Y)_{01} = B(P_{02}) - Y_{01}$$

$$K_1 = 0.59, \quad K_2 = 0.30, \quad K_3 = 0.11$$

CAMERA HAVING DIGITAL-TO-ANALOG CONVERTER WITH VARIABLY SETTABLE REFERENCE LEVEL

This is a continuation application under 37 CFR 1.62 of prior application Ser. No. 512,873, filed Apr. 23, 1990.

BACKGROUND OF THE INVENTION

1. Field of the Invention

This invention relates to a camera including a digital processing circuit of simple arrangement.

2. Description of the Related Art

Figure 6:
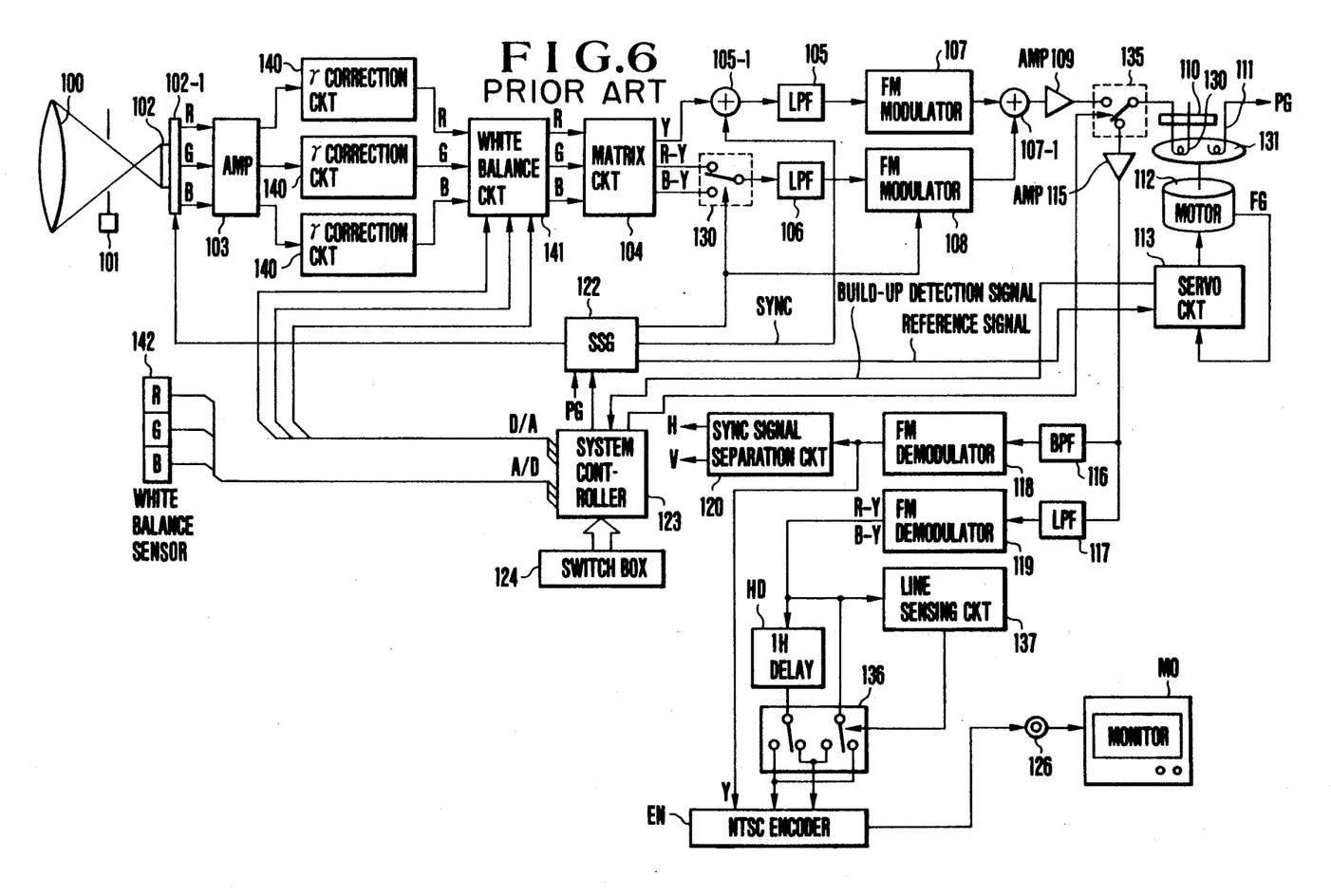
FIG. 6 is a block diagram showing, by way of example, the arrangement of the conventional camera which has a reproducing function.

In an attempt to replace the conventional optical silver-halide type camera, a camera called an electronic still camera has been developed. The electronic still camera is arranged to convert the image of a photographing object into an electrical image signal by means of an image sensor; to record the image signal on a recording medium; and to include a reproduction circuit for reproducing the signal recorded. FIG. 6 of the accompanying drawings shows an example of the camera of this kind.

According to the conventional arrangement of the electronic camera, the object image is allowed only for a moment to be formed on the image sensor 102 through a lens 100 and a shutter 101 and to be converted into electric charge. The electric charge is read out by means of an image sensor driving circuit 102-1 in synchronism with a synchronizing (hereinafter referred to as sync) signal which is generated by a sync signal generator (hereinafter referred to as SSG) 122. A motor 112 is controlled and rotated by a servo circuit 113 in synchronism with a sync signal generated also by the SSG 122. Upon completion of building-up of the rotation control (stabilization of speed), the servo circuit 113 sends a build-up detection signal to a system controller 123 to inform the latter of the stabilization of rotation of the motor 112. Upon receipt of this detection signal, the system controller 123 gives an instruction to the SSG 122 for commencement of reading from the image sensor 102. This causes the image sensor driving circuit 102-1 to read image data from the image sensor 102.

The image data read out from the image sensor 102 includes analog signals obtained from picture elements for the colors R (red), G (green) and B (blue). The R, G and B signals are amplified by an amplifier 103. The amplified signals are supplied via gamma correction circuits 140 to the white balance circuit 141. Meanwhile, external light which is obtained by a white balance sensor 142 is taken into an analog-to-digital (A/D) converter disposed within the system controller 123 and is then output through a digital-to-analog (D/A) converter which is also disposed within the system controller 123. The output of the D/A converter of the system controller 123 is supplied to the white balance circuit 141 to be used for adjusting the balance among the R, G and B signals. After that, the R, G and B signals are supplied to a matrix circuit 104 to be converted into a luminance signal Y and color-difference signals R-Y and B-Y. The color-difference signals R-Y and B-Y are converted into a line-sequential signal conforming to a still video format by outputting them in blocks of horizontal lines alternately through a switch 130 in accordance with a switching signal output from the SSG 122. The line-sequential color-difference signals thus output from the switch 130 are alternately supplied to a low-pass filter (LPF) 106. Meanwhile, the luminance signal Y is supplied to an adder 105-1 to be added together with a (horizontal/vertical) sync signal. After the adder 105-1, the luminance signal Y is supplied to an LPF 105 to remove all the signal components thereof that are outside a modulation band. The signal Y thus processed is supplied to a frequency modulator 107. The line-sequential color-difference signals output from the LPF 106 are frequency-modulated by another frequency modulator 108. The modulated wave of the luminance signal and those of the color-difference signals are frequency-multiplexed by an adder 107-1. The output of the adder 107-1 is supplied to an amplifier 109 to be amplified to a level apposite to recording.

The signal which is thus obtained from the amplifier 109 is supplied via a switch 135 to a recording head 130. The head 130 records the signal on a recording medium 131 in the form of, for example, concentric circles. A carriage 110 is arranged to shift the recording head 130 radially inward or outward over the circular surface of the recording medium 131. A PG sensor 111 is arranged to detect, every time the medium 131 makes one turn, a magnet provided on a center hub of the medium 131. A switch box 124 includes various operation switches.

In reproducing recorded signals from the medium, the head 130 is shifted by the head carriage 110 to a recorded track. A video signal recorded in the track is converted into an electrical signal. During the reproducing operation, the switch 135 acts to supply the electrical signal to a reproduction amplifier 115. The output of the amplifier 115 is then supplied to a band-pass filter (BPF) 116 and a low-pass filter (LPF) 117 respectively. The output of the BPF 116 and that of the LPF 117 are supplied to frequency demodulators 118 and 119 to be converted into the baseband signals of a luminance signal and color-difference signals respectively. The sync signal which is included in the luminance signal Y is separated into a horizontal sync signal H and a vertical sync signal V by a sync signal separation circuit 120. These sync signals are supplied via the SSG 122 to the servo circuit 113, etc., during the process of reproduction. The servo circuit 113 compares the phase of a reference signal output from the SSG 122 with that of an FG signal obtained from a motor 112 to obtain an error signal as the result of comparison. The servo circuit 113 then uses this error signal in rotating the motor 112 according to the signal reproduced.

The color-difference signals are in the line-sequential state as mentioned in the foregoing. During reproduction, therefore, they are converted into a line-simultaneous state through a line-simultaneous conversion circuit, which is formed jointly by a 1-H delay circuit HD, a switch 136 and a line sensing circuit 137. After this, the color-difference signals and the luminance signal are supplied to an NTSC encoder EN to be converted into an NTSC signal, which is supplied via an output terminal 126 to a monitor MO to be displayed in the form of a picture thereon.

The conventional electronic still camera which is arranged as described above, however, necessitates the use of a gain control circuit solely for the purpose of adjusting the white balance of the signals read out from the image sensor. In addition, it has been necessary to use memory means for compensating for a drop-out occurring in the reproduced signal, for correcting jitters, for the line-simultaneous conversion process, etc.

SUMMARY OF THE INVENTION

It is therefore an object of this invention to provide a camera which is capable of solving the above-stated problems of the prior art.

To attain this object, a camera arranged according to this invention as an embodiment thereof comprises: selection means for selecting one of an image signal read out from an image sensor and a reproduced signal obtained from a recording medium; an A/D converter for converting the signal selected by the selection means into a digital signal; storage means for storing the digital signal; and reference control means arranged to control a reference voltage of the A/D converter by using a white balance control signal when the image signal is selected by the selection means and to make the reference voltage constant when the reproduced signal is selected.

The camera which is arranged in the above-stated manner is capable of carrying out white balance control in sensing an image and performing a signal processing operation, such as a line-simultaneous conversion process, etc., by the storage means in reproducing a recorded signal, despite the simple arrangement thereof.

The above and other objects and features of the invention will become apparent from the following detailed description of an embodiment thereof taken in conjunction with the accompanying drawings.

DETAILED DESCRIPTION OF PREFERRED EMBODIMENT

Figure 1:
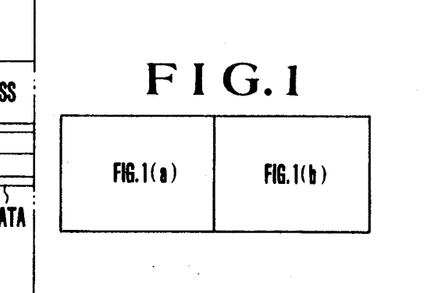
FIGS. 1, 1(a) and 1(b) are block diagrams showing an embodiment of this invention.
Figure 1A:
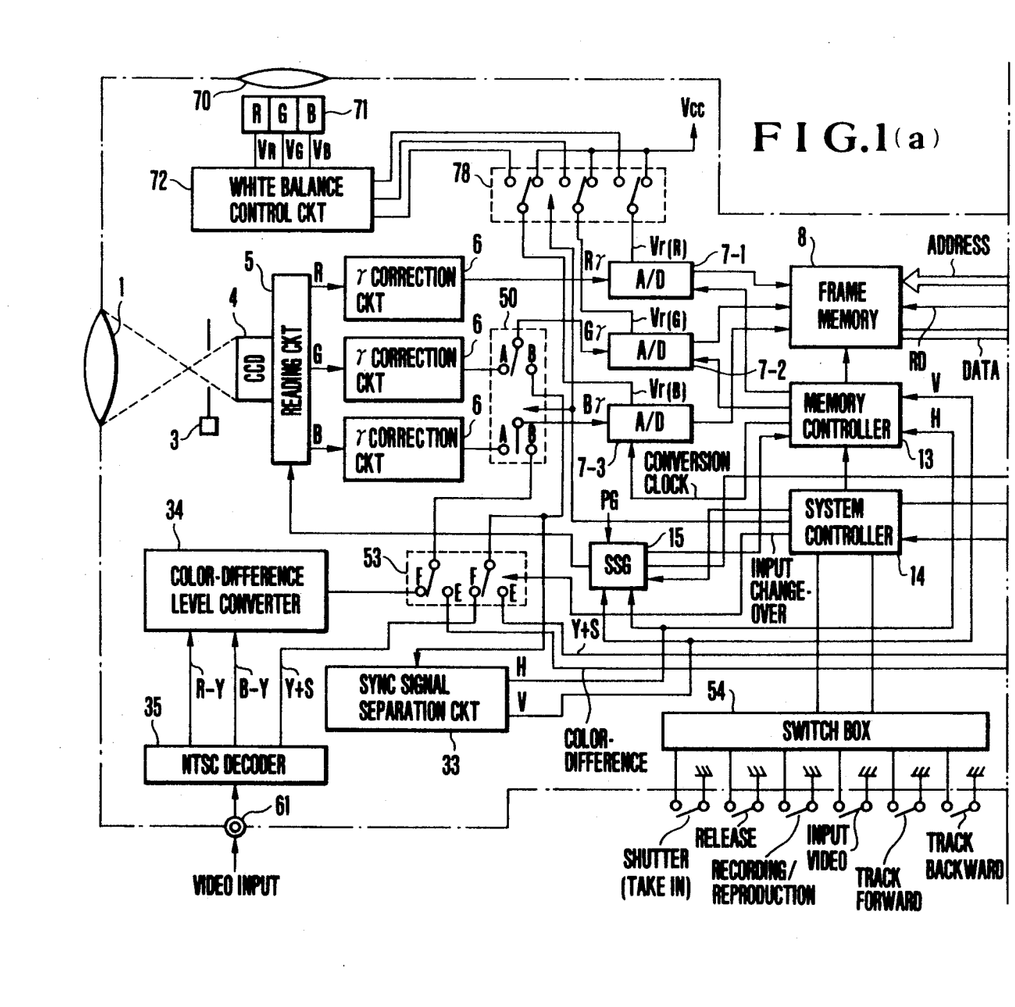
Figure 1B:
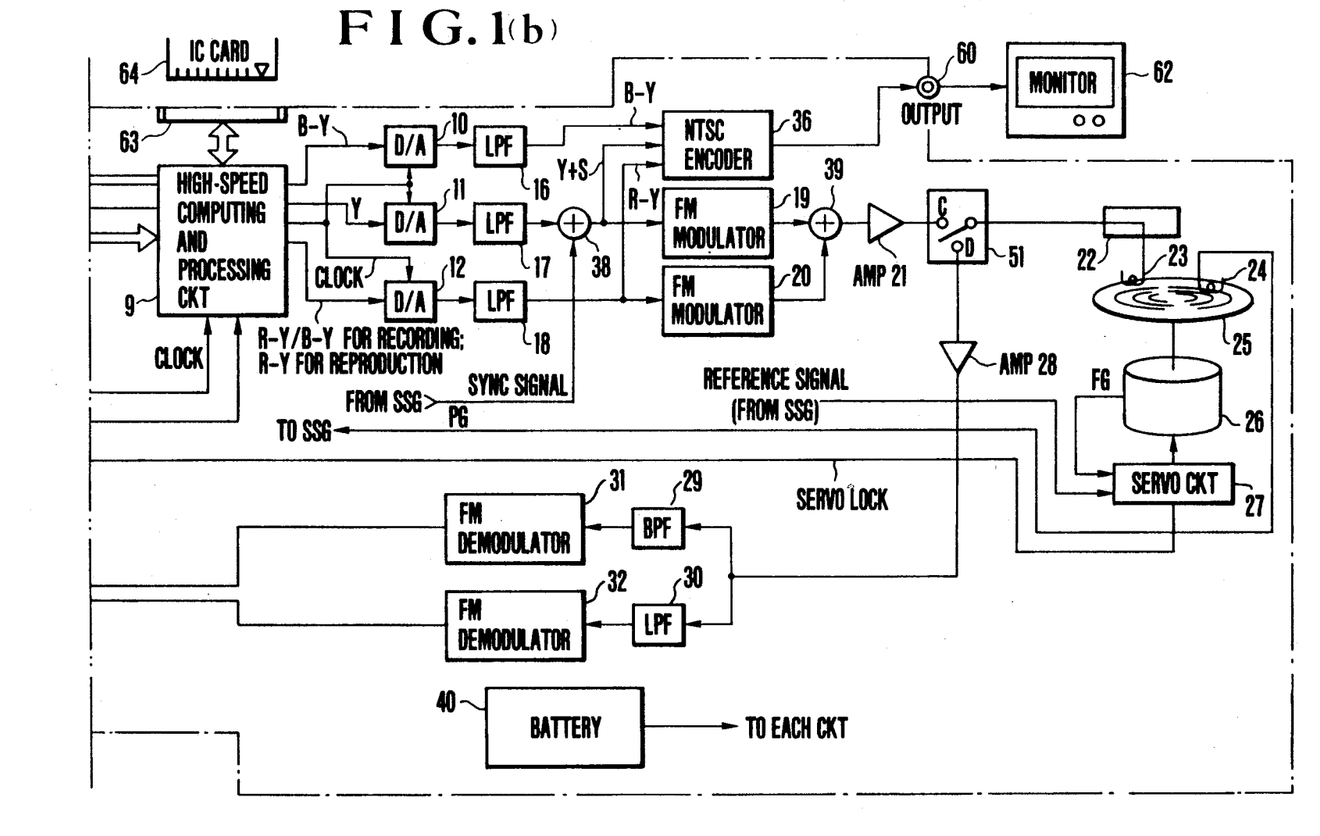

FIGS. 1, 1(a) and 1(b) show the arrangement of a camera which is arranged according to this invention as an embodiment thereof. In these figures, a reference numeral 1 denotes a lens. A numeral 3 denotes an iris. A numeral 4 denotes an image sensor. A reading circuit 5 is arranged to read out data from the picture elements of the image sensor 4. A numeral 6 denotes gamma correction circuits, and numerals 7-1 to 7-3 denote A/D converters. A high-speed computing and processing circuit 9 is arranged to convert the picture element data stored in a frame memory 8 into a video signal. The illustration further includes D/A converters 10, 11 and 12; LPFs 16, 17 and 18; frequency modulators 19 and 20; an NTSC encoder 36; adders 38 and 39; a recording amplifier 21; a head shifting carriage 22; a magnetic head 23; a PG detection coil 24; a recording medium 25; a disc motor 26 which is arranged to rotate the recording medium 25 in a given cycle; a servo circuit 27 which is provided for the motor 26; a memory controller 13; a system controller 14; a reference signal generator (SSG) 15; a reproduction amplifier 28; a band-pass filter (BPF) 29; a low-pass filter (LPF) 30; frequency demodulators 31 and 32; a sync signal separation circuit 33; a color-difference level converter 34; an NTSC decoder 35; and a battery 40. A switch 50 is arranged to shift its connecting position to one side A in photographing (or in sensing images) and to the other side B in reproducing images recorded or in receiving an external input. A switch 51 is arranged to shift its connecting position to one side C in recording, on the magnetic recording medium, an image taken in the memory and to the other side D in reproducing a video signal recorded on the recording medium. A switch 53 is provided for selection between an external video input at F and a reproduced signal at E obtained from the recording medium. Switches 50, 51, and 53 comprise mode selection means, as discussed below. A switch box 54 is provided for external control of the operation of the camera. An output terminal 60 is provided for an external monitor. The illustration further includes an external video input terminal 61; the external monitor 62; an IC card loading part 63 which is provided with a multi-connector; an IC card 64; a color measuring window 70; a color measuring sensor 71 for measuring colors R, G and B; a white balance control circuit 72 and a switch 78.

The embodiment operates as follows: With the lens 1 directed to an object (not shown), a shutter release button is lightly pushed. Then, the system controller 14 begins to effect a supply of power to each of the applicable circuit elements including the image sensor 4, the picture element reading circuit 5, the A/D converters 7-1 to 7-3, the reference signal generator (SSG) 15, the frame memory 8, the memory controller 13, the servo circuit 27, the disc motor 26, other components. The SSG 15 provides the servo circuit 27 with a reference signal for causing the disc motor 26 to be rotated at a given constant speed. The phase of the FG signal obtained from the disc motor 26 is thus synchronized with that of the reference signal.

When the shutter button is further pushed, the aperture of the iris 3 is opened to an aperture position apposite to a correct exposure. This allows the image sensor 4 to convert the light of the object into electric charge and to accumulate it for a predetermined period of time. The picture elements of the image sensor are arranged as shown by way of example in FIG. 2.

Figure 2:
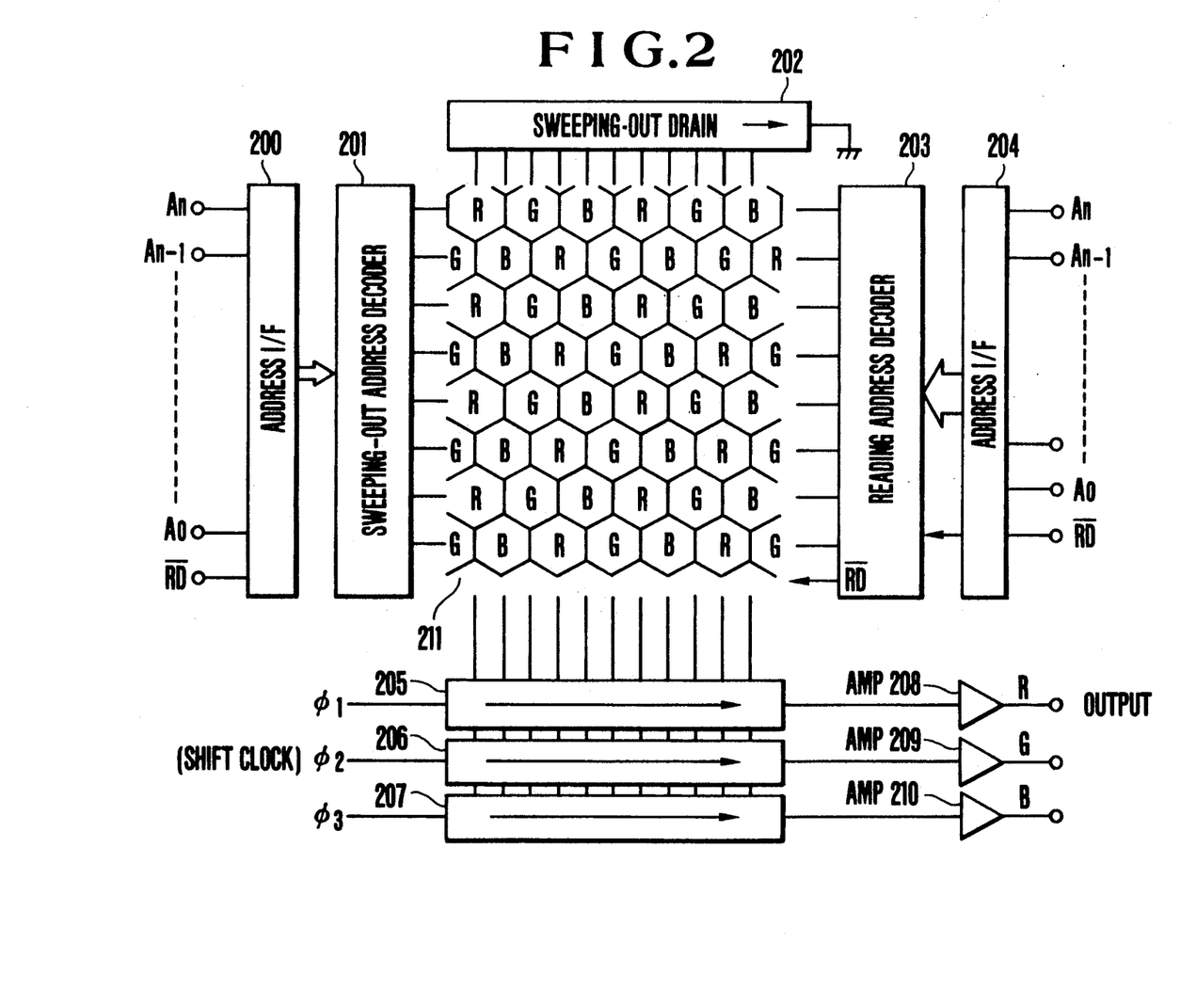
FIG. 2 shows, by way of example, the arrangement of an image sensor employed in the same embodiment.

Referring to FIG. 2, an address decoder 201 is arranged to address the signal of a given line for the purpose of sweeping charge out. An address interface 200 is provided for control over the decoder 201. An address decoder 203 is arranged to address the signal of a given line for the purpose of reading. An address interface 204 is provided for control over the decoder 203. There is provided a drain 202 for discharging the signal of the addressed line at the time of sweeping out. CCDs 205, 206 and 207 are provided for reading out signals R, G and B separately from each other. Amplifiers 208, 209 and 210 are arranged to amplify these signals.

An image sensing part 211 consists of picture element lines. Color filters for the colors R, G and B are juxtaposed with the picture elements arranged in lines. The color phase of each line is arranged to be deviating from that of another line to an extent of 3/2 of the picture element pitch. The picture elements of each line are arranged to deviate from the picture element arrangement of another line as much as ½ picture element pitch.

The electric charge accumulated in the image sensor 4 which is arranged as described above is read out from the picture element lines one after another in turn in a non-interlacing manner. The electric charge signals thus obtained are gamma-corrected by the gamma correction circuits 6. The gamma-corrected signals are supplied to the A/D converters 7-1, 7-2 and 7-3 in synchronism with the signal output from the SSG 15 to be converted into digital signals. At this time, the reference voltage of each of the A/D converters 7-1, 7-2 and 7-3 is controlled by a control signal output from the white balance control circuit 72 through the switch 78. This control is performed in such a way that the white balance adjustment is carried out during the process of the A/D conversion.

The white balance control is arranged to be performed as follows: The light obtained through the color measuring window 70 is detected by the R, G and B sensors which are provided for the white balance control. The levels of R, G and B signals output from these sensors are compared with each other at the white balance control circuit 72. For example, if the levels VR, VG and VB of the R, G and B signals are about equal to each other, the external light is a white light. In the event of a fluorescent light or the like, the level VB becomes higher than others. By using these signal levels VR, VG and VB, three reference voltages Vr(R), Vr(G) and Vr(B) are set by the white balance control circuit 72. Assuming that the gamma-corrected signals are $R_\gamma$ $G_\gamma$ and $B_\gamma$, for example, the white balance control circuit 72 sets these reference voltages as follows:

$$Vr(R) = \left(\frac{VR}{VG}\right)^\gamma \cdot k$$

$$Vr(G) = k$$

$$Vr(B) = \left(\frac{VB}{VG}\right)^\gamma \cdot k$$

wherein: (0<k (constant)<Vcc)

The reference voltages set in the above-stated manner are sent to the A/D converters 7-1, 7-2 and 7-3.

Further, in the case of this specific embodiment, these reference voltages are respectively changed to values as shown below in cases where a video signal reproduced from a magnetic disc or an external video signal is to be taken into the memory 8:

$$Vr(R) = 0 \quad Vr(G) = Vr(B) = k$$

Further, the A/D converter 7-1 for the color R is not used in the case of reproduction.

Figure 3A:
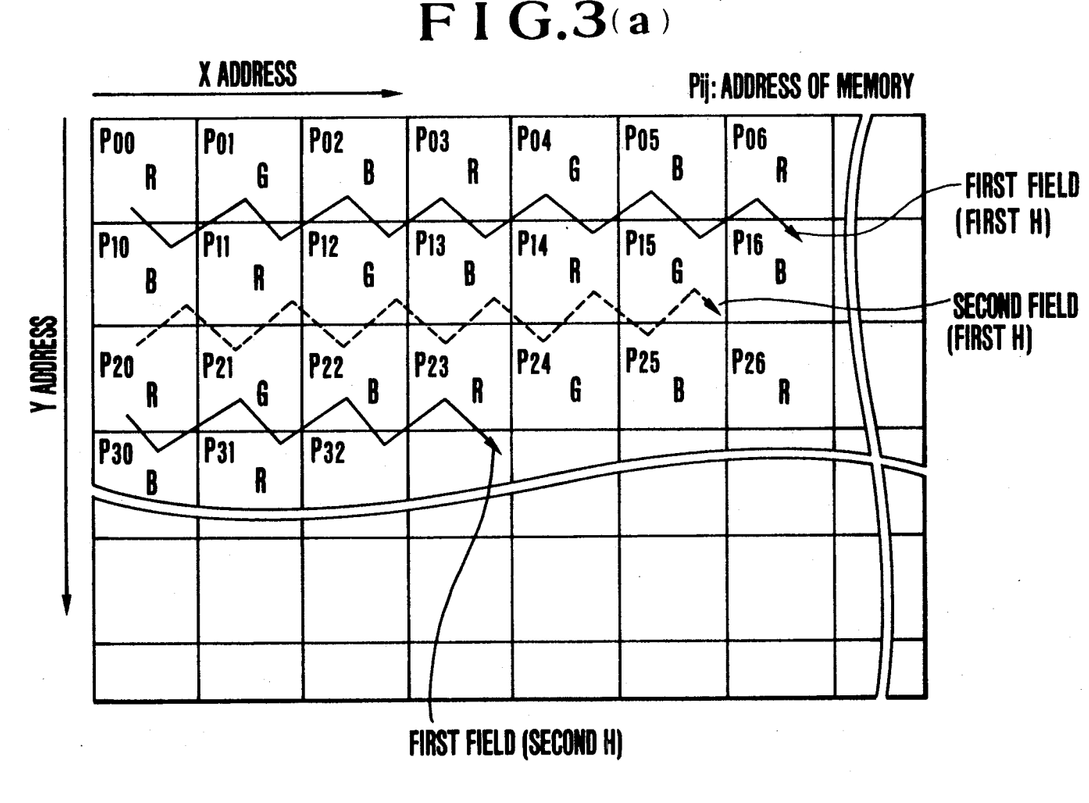
FIG. 3(a) shows how the data from the picture elements of the image sensor is taken into and read out from a frame memory.
Figure 3B:
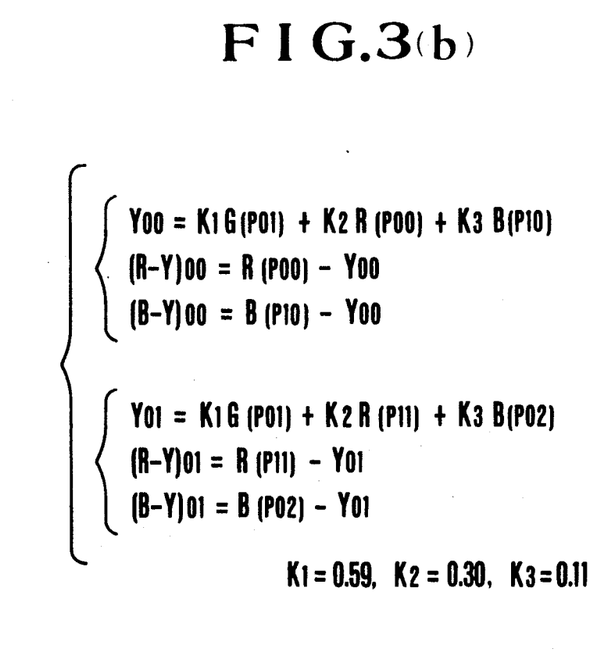
FIG. 3(b) shows formulas for converting the picture element data into a luminance signal and line-sequential color-difference signals.
Figure 4:
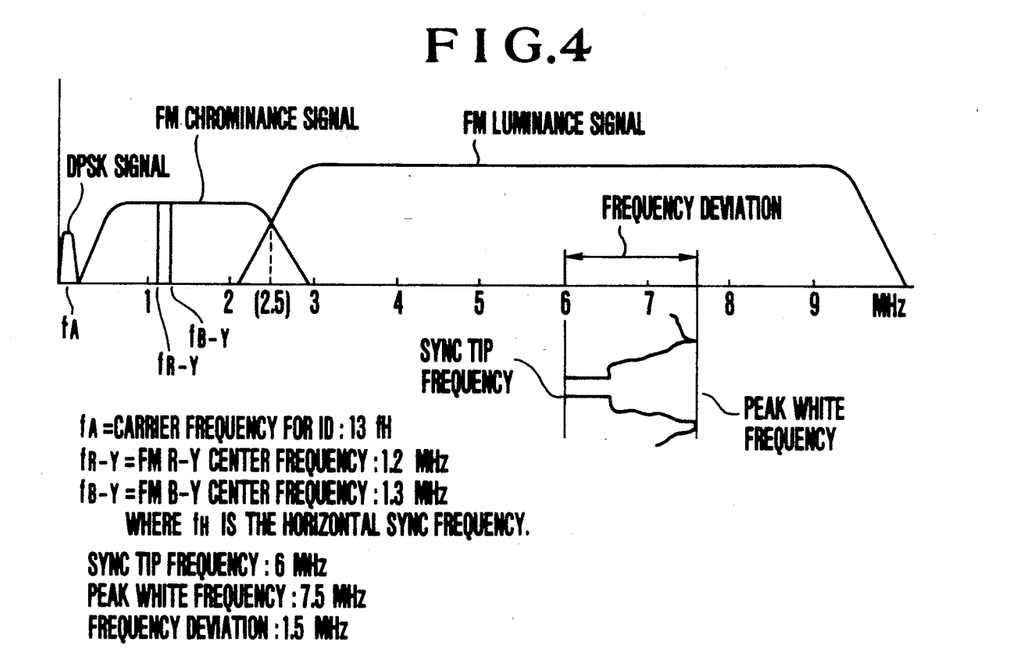
FIG. 4 shows, by way of example, the frequency deviation of frequency modulation performed in recording signals on a magnetic disc.

The picture element data of the image sensor 4 which is digitized by the above-stated A/D converters is stored in turn in the frame memory 8 at addresses corresponding to the picture elements as shown in FIG. 3(a). The picture element data are kept at the frame memory 8 until the magnetic disc (or recording medium) 25 comes to rotate at a given speed. When the rotating speed of the disc 27 reaches the given speed, the servo circuit 27 informs the system controller 14 of this by producing a servo lock signal. Next, the system controller 14 causes the high-speed computing and processing circuit 9 to begin a computing operation on the data of the object image stored in the frame memory 8 to convert the data into a signal form suited for recording on the magnetic disc 25. The computing operation is performed by reading out signals in the following order as shown in FIG. 3(a): The signal of the first H (horizontal line) of a first field, the signal of the second H of the first field and so on, are read out as indicated by full lines; and, after that, the signal of the first H, the signal of the second H, - - - of a second field are read out in an interlacing manner as indicated by broken lines. The signals read out are subjected to a computing process which is carried out as shown in FIG. 3(b). By the computing process, a digital luminance signal Y and a digital color-difference line-sequential signal are formed in synchronism with clock signals output from the SSG 15. These digital signals are supplied to the D/A converters 11 and 12 to be converted into analog signals. The conversion frequency values of these D/A converters are determined according to a frequency band which is recordable on the magnetic disc. The analog luminance signal Y thus obtained is supplied to the LPF 17 to have its frequency band limited there. After the LPF 17, the luminance signal Y is supplied to the adder 38 to be added together with the sync signal output from the SSG 15. The output of the adder 38 is frequency-modulated by the frequency modulator 19. The color-difference line-sequential signal R-Y/B-Y is likewise frequency-modulated through the LPF 18 and the frequency modulator 20. The modulating center frequencies of the luminance and color-difference signals are arranged to be, for example, as shown in FIG. 4. The modulated waves of the color-difference signals are frequency-multiplexed with that of modulated wave of the luminance signal by the adder 39. The frequency-multiplexed signal thus obtained is supplied via the recording amplifier 21 to the magnetic head 23 to be recorded on the magnetic disc 25 in a concentric circular shape. When one image is recorded, the head carriage 22 shifts the position of the head 23 radially inward over the disc to wait for a next shot. In a case where the shutter release button is continuously pushed under this condition, the rotation of the motor 26 is allowed to continue. If the release button is not pushed any further, the rotation of the motor 26 is brought to a stop and the supply of power to the image sensor 4, the reading circuit 5, the A/D converters 7-1 to 7-3, the frame memory 8, the high-speed computing and processing circuit 9, the D/A converters 10, 11 and 12, the frequency modulators 19 and 20, other components, is cut off.

In reproducing an image recorded on the disc, the reproduction side of a recording/reproduction change-over switch is selected. Then, the connecting position of the switch 50 is shifted to side B thereof. The connecting position of the switch 78 is shifted to select the constant voltage Vcc. The position of the switch 51 is shifted to one side D thereof to allow a signal reproduced by the magnetic head 23 to come to the reproduction amplifier 28. The reproduced signal is then divided into two different signals, i.e., the modulated wave of a luminance signal and those of color-difference signals. These signals are supplied to the frequency demodulators 31 and 32 to be demodulated into a baseband luminance signal and baseband color-difference signals. In a case where the video input switch is open, the position of the switch 53 is on one side E thereof. This allows the above-stated signals processed by the demodulators 31 and 32 to be supplied to the A/D converters 7-2 and 7-3 respectively.

The demodulated luminance signal includes a sync signal. This sync signal is separated by the sync signal separation circuit 33 into a vertical sync signal and a horizontal sync signal. These sync signals are supplied to the SSG 15 and the memory controller 13. The FG signal which is obtained from the motor 26 is supplied to the servo circuit 27 to be phase-compared with the reference signal output from the SSG 15. The result of comparison is used in rotating the magnetic disc 25 in a given cycle. When the motor 26 comes to correctly rotate, the servo circuit 27 informs the system controller 14 of this by producing a servo lock signal. In response to this, the system controller 14 instructs the SSG 15 to produce a timing signal for taking A/D-converted data into the frame memory 8. The memory controller 13 then supplies the A/D converters 7-2 and 7-3 with an A/D conversion timing signal in synchronism with the vertical and horizontal sync signals obtained by the sync signal separation circuit 33. Further, the memory controller 13 supplies the frame memory 8 with writing addresses from the SSG 15. During the process of taking one picture amount of image data into the frame memory 8, the outputs of the D/A converters 10, 11 and 12 are muted.

Figure 5:
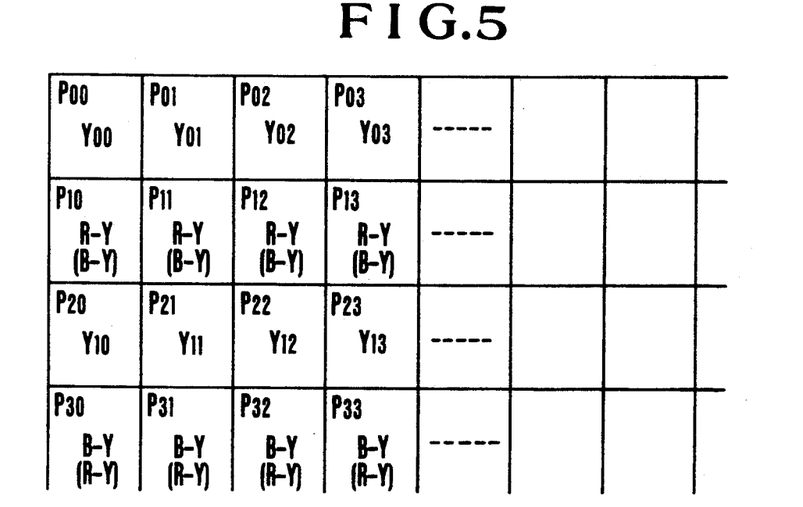
FIG. 5 shows, by way of example, a manner in which signals reproduced from a magnetic disc or the like are stored in a frame memory.

The color-difference signals which are supplied through the switch 50 to the A/D converter 7-3 are at different DC levels. Therefore, in taking the data into the frame memory 8, a discrimination is made between the color-difference signals R-Y and B-Y on the basis of this difference in DC level. When the data is completely taken into the frame memory 8, the SSG 15 supplies a computing timing clock signal to the high-speed computing and processing circuit 9. The signal form of the image signal written into the frame memory 8 during the process of reproduction differs from that of the signal accumulated at the time of image sensing (or photographing). In other words, while the data of the picture elements of the image sensor 4 is written in the order of the picture elements in image sensing, the data is written into the frame memory 8 in the forms of luminance and color-difference signals as shown in FIG. 5 in the case of reproduction.

The high-speed computing and processing circuit 9 supplies the D/A converters 10, 11 and 12 respectively with the digital data of the luminance signal and the color-difference line-sequential signals in the forms of a line-simultaneous color-difference signal B-Y, a luminance signal Y and a line-simultaneous color-difference signal R-Y. In the case of this embodiment, these D/A converters are arranged to operate according to one and the same clock signal. However, this arrangement may be changed to apply discrete clock signals to them according to their frequency bands. The analog-converted luminance and color-difference signals are converted into a standard video signal by the NTSC encoder 36. The video signal thus obtained is output from an output terminal 60 to be supplied, for example, to a monitor 62 for the purpose of displaying it thereon in the form of a picture.

In recording an external input signal on the magnetic disc 25, the embodiment operates as follows: When the external input video switch is closed, the system controller 14 shifts the connecting position of the switch 50 to side B thereof and that of the switch 53 to side F which is provided for an external input video signal. The input video signal is supplied to the NTSC decoder 35 to be converted into a luminance signal including a sync signal (Y+S) and line-simultaneous color-difference signals R-Y and B-Y. The luminance signal is supplied to the sync signal separation circuit 33 to have the sync signal separated therefrom. Meanwhile, the color-difference signals R-Y and B-Y are supplied to the color-difference level converter 34 to be subjected to a given offsetting process. After offsetting, the color-difference signals R-Y and B-Y are output alternately by changing them from one over to the other for every horizontal synchronizing period H. The A/D converters 7-2 and 7-3 digitize these signals in the same manner as in the case of reproducing a record from the magnetic disc.

The operation of the embodiment is described further as follows: When the release button is pushed, power is supplied to the A/D converters 7-2 and 7-3, the memory controller 13, the frame memory 8, and other components. The memory controller 13 supplies the A/D converters with an A/D conversion clock signal when a shutter (take-in) switch is operated. Then a writing signal and address information are supplied to the frame memory 8 to cause the digitized signals output from the A/D converters to be serially stored in the frame memory 8. The video signal is written into the frame memory 8 in the form of a luminance signal and color-difference signals as shown in FIG. 5.

The A/D converters 7-1 to 7-3, the high-speed computing and processing circuit 9 and the D/A converters 10, 11 and 12 are formed in discrete blocks in the case of this embodiment. However, they can be formed in a single IC. Further, the embodiment is arranged to use a magnetic disc as the recording medium. However, the same advantageous effect of the invention is attainable by using a photo-magnetic disc, an IC card, a magnetic tape or the like in place of the magnetic disc. Further, the image sensor 4 may be a CCD or an X-Y address type image sensor.

Further, the embodiment described is arranged to have the white balance control signal formed by means of the white balance control circuit 72. This arrangement, however, may be changed to have white balance control signals formed by the system controller 14, for example, after A/D converting the outputs of the R, G and B color sensors, by D/A converting this control signal into analog signals, and then by supplying these analog signals to the A/D converters 7-1, 7-2 and 7-3 as reference signals.

The arrangement described in the foregoing enables the embodiment of the invention to be capable of performing the white balance adjustment by utilizing the A/D converters for white balance control during the process of image sensing i.e., a first mode. During a reproducing operation, i.e., a second mode the embodiment simply controls reading from a storage part in attaining the same effect as the effect attained by the use of circuits for a simultaneous converting process, a drop-out compensating process, a jitter correcting process, and like processes, without recourse to these circuits. These circuits are also not employed in the third mode in which an external signal is input to terminal 61.

What is claimed is:
1. A camera comprising:
a) selection means for selecting one of an image signal read out from an image sensor and a reproduced signal obtained from a recording medium;

b) an analog-to-digital converter for converting the signal selected by said selection means into a digital signal;

c) storage means for storing said digital signal; and d) reference control means arranged to control a reference voltage of said analog-to-digital converter by using a white balance control signal when said image signal is selected by said selection means and to make said reference voltage constant when said reproduced signal is selected by said selection means.

2. A camera according to claim 1, further having facility for receiving an external input signal and wherein said selection means is arranged to be capable of selecting also said external input signal.

3. A camera according to claim 1, wherein said storage means includes a frame memory.

4. A camera according to claim 2, wherein said reference control means is arranged to make said reference voltage constant also when said external input signal is selected by said selection means.

5. A camera comprising a) image sensing means;

b) an analog-to-digital converter arranged to analog-to-digital convert an output of said image sensing means, said analog-to-digital converter having a reference signal which is variable;

c) selection means disposed between said image sensing means and said analog-to-digital converter and arranged to selectively supply either an output of said image sensing means or a signal other than the output of said image sensing means to said converter; and d) control means arranged to change over the reference signal of said analog-to-digital converter according to the selection made by said selection means.

6. A camera according to claim 5, further having facility for receiving an external input signal and wherein said selection means is arranged to be capable of selecting also said external input signal.

7. A camera according to claim 5, further comprising memory means for storing a signal converted by said analog-to-digital converter.

8. A camera according to claim 7, further comprising recording means for recording a signal processed through said memory means.

9. A camera according to claim 8, wherein said selection means is arranged to be capable of supplying to said analog-to-digital converter a reproduced signal obtained from said recording means.

10. A camera according to claim 5, further comprising white balance control means for controlling the reference signal of said analog-to-digital converter according to a color temperature of an object to be photographed.

11. A video camera comprising:

a) analog-to-digital converter means for converting input signals thereto into digital signals, said analog-to-digital converter means having reference voltage input which is variable;

b) image sensing means for generating a first analog video signal;

c) reproducing means for reproducing a second analog video signal from a recording medium; and d) mode selection means for selecting a mode of operation of the video camera from a plurality of modes, the plurality of modes including, a first mode in which said first analog video signal is input to said analog-to-digital converter and said reference voltage input is variably set, and a second mode in which said second analog video signal is input to said analog-to-digital converter and said reference voltage input is constant.

12. A video camera according to claim 11, further comprising a memory for storing digital signals obtained by said analog-to-digital converter means, and recording means for recording analog signals processed through said memory on said recording medium, said recording means including digital-to-analog converter means for converting input signals thereto into analog signals.

13. A video camera according to claim 12, wherein said recording means further includes a frequency modulation circuit for frequency modulating analog signals obtained by said digital-to-analog converter means.

14. A video camera according to claim 13, further comprising output means for outputting analog signals processed through said digital-to-analog converter means externally of the video camera.

15. A video camera according to claim 11, further comprising input means for inputting an external analog video signal, and wherein said plurality of modes further includes a third mode in which said external analog video signal is input to said analog-to-digital converter means and said reference voltage input is constant.

16. A video camera comprising:

a) analog-to-digital converter means for converting input signals thereto into digital signals, said analog-to-digital converter means having reference voltage input which is variable;

b) image sensing means for generating an internal analog video signal;

c) input means for inputting an external analog video signal; and d) mode selection means for selecting a mode of operation of the video camera from a plurality of modes, the plurality of modes including a first mode in which said internal analog video signal is input to said analog-to-digital converter means and said reference voltage input is able to be varied, and a second mode in which said external analog video signal is input to said analog-to-digital converter means and said reference voltage input is constant.

17. A video camera according to claim 16, further comprising a memory for storing digital signals obtained by said analog-to-digital converter means, and recording means for recording analog signals processed through said memory on a recording medium, said recording means including digital-to-analog converter means for converting input signals thereto into analog signals.

* * * * *